(12) United States Patent
Katsura (10) Patent No.: US 6,377,324 B1
(45) Date of Patent: Apr. 23, 2002

(54) STRUCTURE FOR INSTALLING FLEXIBLE LIQUID CRYSTAL DISPLAY PANEL

(75) Inventor: Takatoshi Katsura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/367,283

(22) PCT Filed: Dec. 24, 1997

(86) PCT No.: PCT/JP97/04791

§ 371 Date: Aug. 16, 1999

§ 102(e) Date: Aug. 16, 1999

(87) PCT Pub. No.: WO99/34348

PCT Pub. Date: Jul. 8, 1999

(51) Int. Cl.7 ............................................. G02F 1/1333
(52) U.S. Cl. ..................................................... 349/58
(58) Field of Search .................. 349/58, 160; 313/511; 345/1, 3, 901; 361/681

(56) References Cited

U.S. PATENT DOCUMENTS

| | | | | |
|---|---|---|---|---|
| 3,748,971 A | * | 7/1973 | Grundell ...................... | 93/1 E |
| 5,469,020 A | * | 11/1995 | Herrick ....................... | 313/511 |
| 5,734,513 A | * | 3/1998 | Wang et al. ................. | 359/742 |
| 6,057,814 A | * | 5/2000 | Kalt ............................. | 345/58 |
| 6,067,074 A | * | 5/2000 | Lueders ....................... | 345/156 |

FOREIGN PATENT DOCUMENTS

| | | | |
|---|---|---|---|
| EP | 0777985 A1 | * | 11/1996 |
| GB | 2218631 A | * | 11/1989 |
| JP | 59147121 | | 10/1984 |
| JP | 407181462 A | * | 7/1995 |
| JP | 8248895 | | 9/1996 |
| JP | 411073262 A | * | 3/1999 |

OTHER PUBLICATIONS

Sheraw et. al.; "An organic thin film transistor backplane for fexible liquid crystal display"; Device Research Conference., 2000, Conference Digest, 58th DRC, 200, pp. 107–108 (2000).*

Kaneto et al.; "foldable–display systems as a standard flatform for mutimedia use"; Consumer Electronics, IEEE transactions on, vol. 42, Issue 1, Feb. 1996, pp. 17–21 (1996).*

Ma et al. "Thin film transistors for foldable displays"; ; Electron Devices Meeting, 1997, Technical Digest, International, pp. 535–538 (1997).*

Burrows et al.; "Achieving Full–color organic light–emitting devices for lightweight, flat–panel displays", IEEE transactions on electron device, vol. 44 Issue 8, Aug. 1997 pp. 1988–1203 (1997).*

* cited by examiner

*Primary Examiner*—Kenneth Parker
*Assistant Examiner*—Hoan C. Nguyen
(74) *Attorney, Agent, or Firm*—Rothwell, Figg, Ernst & Manbeck (57) ABSTRACT

A clearance groove for receiving a bend in a flexible liquid crystal display panel that is formed by folding a liquid crystal display panel mounting member is provided near the folding portion of the liquid crystal display panel mounting member, by which the bend is received in the clearance groove with a sufficient curvature when the liquid crystal display panel mounting member is folded; hence, it is possible to prevent the bend from damage and degradation even if the bending frequency of the flexible liquid crystal display panel increases.

12 Claims, 7 Drawing Sheets

STRUCTURE FOR INSTALLING FLEXIBLE LIQUID CRYSTAL DISPLAY PANEL

TECHNICAL FIELD

The present invention relates to a flexible liquid crystal display panel mounting structure to ensure a predetermined curvature at a bend in a flexible liquid crystal display panel, thereby preventing the bend from damage and degradation.

BACKGROUND ART

A liquid crystal display device has been widely used for display with personal computers, TVs and so forth. Since this conventional liquid crystal display device usually has a construction in which a liquid crystal for displaying characters and the like is held between sheets of hard glass, it cannot provide a display with bending.

Incidentally, portable electronic equipment, typified by portable information terminals called notebook personal computers, electronic notebooks and PDA (Personal Digital Assistants), has its not-shown main body and lid coupled by hinge or similar means so that its entire structure folds flat into two to comply with a request for reduction its size and weight.

In the case of mounting the conventional liquid crystal display device on the portable electronic equipment of such a construction, separate liquid crystal display devices are mounted on the main body and the lid, respectively, and the both devices are interconnected by predetermined signal lines to form a single large display screen with the main body and the lid opened. Such technical means is disclosed, for example, in JP-A-5/298257, JP-U-5/43218, and JP-A-8/248895.

The reason for the formation of such a large display screen by mounting a liquid crystal display device on each of the main body and the cover is that one large liquid crystal display device cannot be mounted on the portable electronic equipment across its folding portion since the liquid crystal display device cannot be bent as referred to above. As a result, display images are discontinuous at the folding portion and hence are hard to see; thus, there has been a demand for the development of a liquid crystal display device that produce a display in its entirety even if bent.

Under such circumstances, a liquid crystal display device capable of providing a display even if bent has recently been developed. For example, according to Nihon Keizai Shimbun dated May 26, 1997, it was reported that a soft and freely bendable liquid crystal display device like a film had been developed by a research team at Kyushu University.

This liquid crystal display device has about the same hardness as that of a photographic negative film and is applicable to a large-area display device; it is considered to have a wide variety of applications such as an advertising poster to be wrapped around a pole and a thin instrument board to be pasted on a windshield, and it is expected that this display device has wide application areas. More specifically, this liquid crystal display device is made freely bendable by holding the liquid crystal between film-like, soft high molecular members in place of sheets of hard glass.

Figure 19:
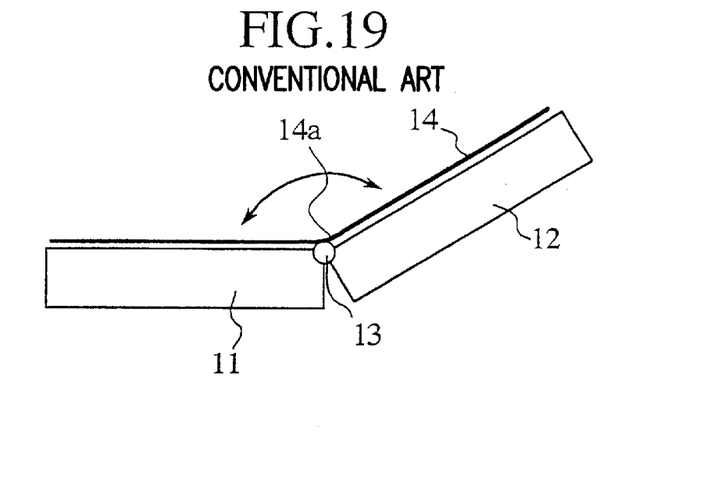
FIG. 19 is a side view depicting the state in which a flexible liquid crystal display panel is mounted on conventional portable electronic equipment.
Figure 20:
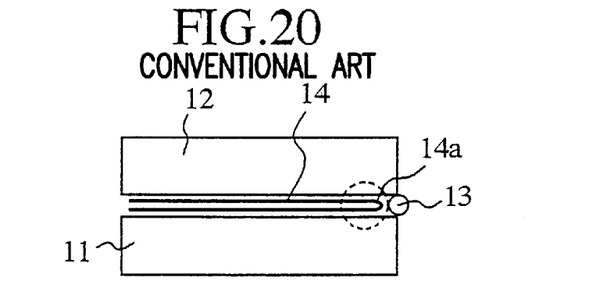
FIG. 20 is a side view showing the flexible liquid crystal display panel when the Portable electronic equipment is folded up.
Figure 21:
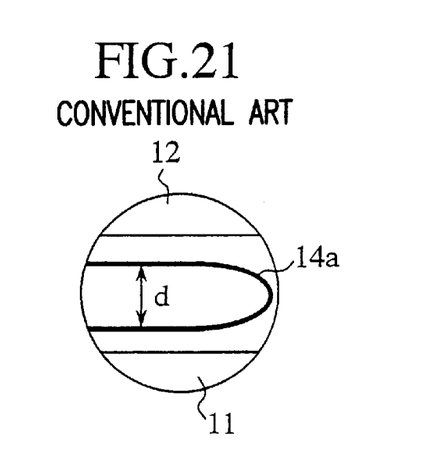
FIG. 21 is An enlarged diagram showing a bend in the flexible liquid crystal display panel.

Accordingly, a single large display screen, over which no display images are discontinuous, can now be realized by mounting such a liquid crystal display device (hereinafter referred to as a "flexible liquid crystal display panel") on portable electronic equipment across its folding portion as depicted in FIGS. 19 through 21.

FIG. 19 is a side view showing the state in which the flexible liquid crystal display panel is mounted on conventional portable electronic equipment, FIG. 20 a side view showing the flexible liquid crystal display panel when the portable electronic equipment is folded flat into two, and FIG. 21 an enlarged side view showing the bend in the flexible liquid crystal display panel. In the drawings, reference numeral 11 denotes a main body of the portable electronic equipment, 12 a lid, and 13 a hinge or similar coupling means by which the lid 12 is openably and closably coupled to the main body 11. Reference numeral 14 denotes a flexible liquid crystal display panel fixedly secured to the main body 11 and the lid 12 over the entire their surface areas, and 14a a bend that forms near the coupling means 13 when the flexible liquid crystal display panel 14 is folded. Incidentally, the bend 14a and its vicinity of the flexible liquid crystal display panel 14 are not fixed to the main body 11 and the lid 12 so that they do not hinder the bending of the panel.

Reference character "d" denotes a gap defined between top and bottom flexible liquid crystal display panel portions 14 and 14 so as to enable the bend 14a to maintain a predetermined curvature when the lid 12 is closed.

Since the conventional mounting structure for the flexible liquid crystal display panel has such a construction as described above, minimization of the gap "d" is needed to meet the request for low-profile, miniature portable electronic equipment; on the other hand, the reduction in the gap "d" decreases the curvature of the bend 14a, too, giving rise to a problem that the bend 14a becomes more likely to be damaged and degraded with an increase in the frequency of opening and closing of the lid 12, i.e. the frequency of folding and unfolding of the flexible liquid crystal display panel 14.

The present invention is intended to solve the above-mentioned problem and has for its object to provide a flexible liquid crystal display panel mounting structure that is capable of preventing the bend in the flexible liquid crystal display panel from damage and degradation even if its folding and unfolding frequency increases.

DISCLOSURE OF THE INVENTION

According to the present invention, a clearance groove for receiving the bend in the flexible liquid crystal display panel that is formed by folding a liquid crystal display panel mounting member is provided near the folding portion of the liquid crystal display panel mounting member, by which the bend is received in the clearance groove with a sufficient curvature when the liquid crystal display panel mounting member is folded. With this structure, it is possible to prevent the bend from damage and degradation even if the bending frequency of the flexible liquid crystal display panel increases.

Furthermore, according to the present invention, clearance groove is provided so that its opposite end portions in its lengthwise direction are not exposed onto side surfaces of the liquid crystal display panel mounting member. This provides for enhanced appearance of the side surfaces of the liquid crystal display panel mounting member.

Moreover, according to the present invention, a stopper for keeping the bend in the flexible liquid crystal display panel from getting out of the clearance groove when the display panel is bent is provided on the liquid crystal display panel mounting member. This makes it possible to keep the bend in the flexible liquid crystal display panel from getting out of the clearance groove when the display panel is bent, enabling the bend to smoothly enter the clearance groove.

Besides, according to present invention, a stopper is provided which couples the bend in the flexible liquid crystal display panel and the clearance groove opposite thereto to prevent the bend from getting out of the clearance groove when the display panel is bent. This secures the appearance of the display screen and, at the same time, prevents the bend in the flexible liquid crystal display panel from getting out of the clearance groove when the display panel is bent, enabling the bend to smoothly enter the clearance groove.

In addition, according to the present invention, a stopper is provided in the clearance groove which keeps the bend in the flexible liquid crystal display panel from getting out of the clearance groove when the display panel is bent and which guides the bend into the clearance groove while following the movement of the bend when it enters the clearance groove. This enables the bend to enter the clearance groove surely and smoothly regardless of the extent to which the bend enters the clearance groove.

Additionally, according to the present invention, a folding angle limiting member is mounted on the liquid crystal display panel mounting member to limit the folding angle of the liquid crystal display panel mounting member so that the included angle, which is formed between the flexible liquid crystal display panel members by the folding of the liquid crystal display panel mounting member, does not exceed 180 degrees. This prevents breakage of the bend in the flexible liquid crystal display panel by excessive opening of the liquid crystal display panel mounting member.

And, according to the present invention, the stopper is made of a transparent material. By this, it is possible to prevent that display images on the flexible liquid display panel are not discontinuous at the position where the stopper is disposed.

Besides, according to the present invention, a warp preventive member is disposed between the bend and the stopper. By this, it is possible to keep the bend in the flexible liquid crystal display panel from warping and hence prevent distortion of display images.

Moreover, according to the present invention, the stopper is formed by a wire-like member. This permits reduction of the space where to provide the stopper.

In addition, according to the present invention, the stopper is formed by a plate-like member. This secures large strength than the stopper formed by a wire-like member.

Additionally, according to the present invention, a touch-sensitive input operating part through which data can be entered by touching is provided as an integral part of the flexible liquid crystal display panel. This contributes to making the display screen large in a limited space.

Besides, according to the present invention, the clearance groove is curved in section. This enables the bend in the flexible liquid crystal display panel to smoothly enter the clearance groove and reduces their contact friction, effectively preventing the bend from damage and degradation by abrasion.

BEST MODE FOR CARRYING OUT THE INVENTION

To describe the present invention more in detail, the best mode for carrying out the invention will be described with reference to the accompanying drawings.

Embodiment 1

Figure 1:
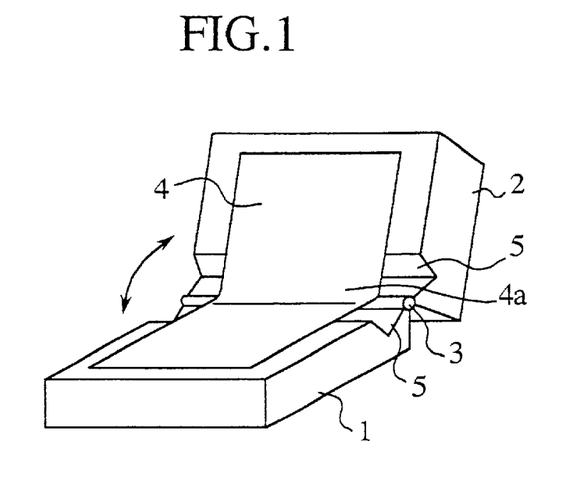
FIG. 1 is a perspective view depicting the open-up state of portable electronic equipment using a flexible liquid crystal display panel mounting structure according to Embodiment 1 of the present invention.
Figure 2:
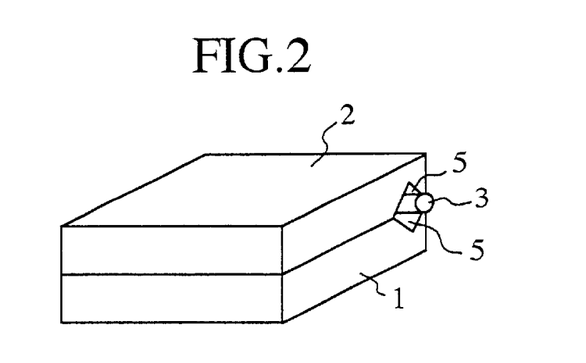
FIG. 2 is a perspective view depicting the closed state of the portable electronic equipment using the flexible liquid crystal mounting structure.
Figure 3:
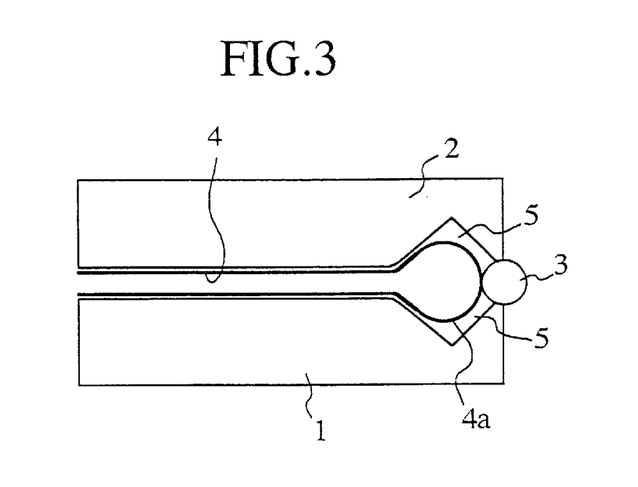
FIG. 3 is a side view showing the flexible liquid crystal display panel mounting structure.

FIG. 1 is a perspective view showing the open-up state of portable electronic equipment using flexible liquid crystal display panel mounting structure according to Embodiment 1 of the present invention, FIG. 2 is a perspective view showing the closed state of the portable electronic equipment using the flexible liquid crystal display panel mounting structure, and FIG. 3 is a side view showing the flexible liquid crystal display panel mounting structure.

In FIGS. 1 through 3, reference numeral 1 denotes the main body of portable electronic equipment (a liquid crystal display panel mounting member), 2 a lid (a liquid crystal display panel mounting member), and 3 a hinge or similar coupling means for openably and closably coupling the lid 2 to the main body 1.

Reference numeral 4 denotes one flexible liquid crystal display panel fixedly mounted on the main body 1 and the lid 2 over their entire surface areas. This flexible liquid crystal display panel 4 has, as an integral part of it, a touch-sensitive input operating part through which data can be entered by touching, not shown. Reference numeral 4a denotes a bend that forms in the vicinity of the coupling means 3 when the flexible liquid crystal display panel 4 is bent.

Reference numeral 5 denotes opposed clearance grooves opposed to both of the main body 1 and the lid 2 in the neighborhood of the coupling means 3 to form a space for receiving the bend 4a when the lid 2 is closed. The clearance grooves 5 are formed triangular in section and their depths are determined according to the curvature of the bend 4a to be provided. Incidentally, it is needless to say that the bend 4a and its vicinity of the flexible liquid crystal display panel 4 are not fixed to the clearance grooves 5 so as to vary the curvature of the bend.

Next, the operation of this embodiment will be described.

As depicted in FIG. 3, when the lid 2 is closed, the bend 4a of the flexible liquid crystal display panel 4 enters the clearance grooves 5, so that a sufficiently large curvature of the band can be ensured.

As described above, according to this Embodiment 1, when the lid 2 is closed, the bend 4a in the flexible liquid crystal display panel 4 enters the clearance grooves 5 with a sufficiently large curvature; hence, it is possible to produce an effect of preventing the bend 4a from damage and deterioration even if the bending frequency of the flexible liquid crystal display panel 4 increases.

Furthermore, since the touch-sensitive input operating part, not shown, is an integral part of the flexible liquid crystal display panel 4, a switching member for data entry need not be provided outside the display screen; hence, the surface areas of the main body 1 and the cover 2 can be utilized to the utmost and the display screen can be made large accordingly.

Embodiment 2

Figure 4:
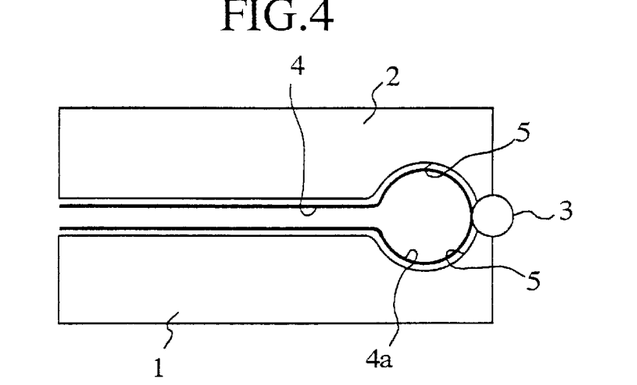
FIG. 4 is a side view showing a flexible liquid crystal display panel mounting structure according to Embodiment 2 of the present invention.

FIG. 4 is a side view depicting a flexible liquid crystal display panel mounting structure according to Embodiment 2 of the present invention. In the following description, the parts identical with or corresponding to those already described are identified by the same reference numerals and no description will be repeated.

In FIG. 4, the clearance grooves 5 are each substantially semicircular (curved) in section and its radius or curvature is determined in accordance with the curvature of the bend 4a to be provided. Other parts of this embodiment are the same as those of the above-described Embodiment 1, and hence they will not be described.

Next, the operation of this embodiment will be described.

When the lid 2 is closed, the bend 4a in the flexible liquid crystal display panel 4 enters the clearance grooves 5 with a sufficiently large curvature.

Furthermore, since the clearance grooves 5 are substantially semicircular in section, the bend 4a smoothly goes into the clearance grooves 5 and their contact friction is decreased. This effectively prevents the bend 4a from degradation and damage by friction.

As described above, according to this Embodiment 2, bend 4a smoothly enters the clearance grooves 5 and their contact friction can be reduced, making it possible to effectively prevent the bend 4a from damage and deterioration by friction.

While the clearance grooves 5 have been described to be substantially semicircular in section in the above Embodiment 2, their sectional configuration is not limited specifically thereto but may also be other curved one.

Embodiment 3

Figure 5:
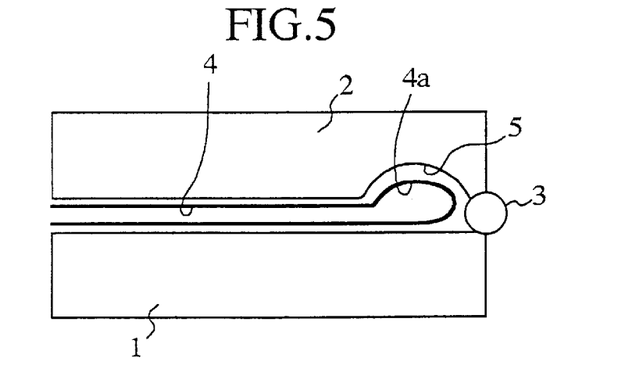
FIG. 5 is a side view showing a flexible liquid crystal display panel mounting structure according to Embodiment 3 of the present invention.

FIG. 5 is a side view showing a flexible liquid crystal display panel mounting structure according to Embodiment 3 of the present invention, and in FIG. 5, only the lid 2 has the clearance groove 5 near the coupling means 3 and its section is substantially semicircular (curved). Moreover, the radius or curvature is determined in accordance with the curvature of the bend 4a to be provided.

Other parts and operation of this embodiment are the same as in the above-described Embodiment 1, and hence they will not be described.

As mentioned above, according to this Embodiment 3, it is possible to readily meet, with one clearance groove 5, the case where the curvature of the bend 4a to be provided may be relative small; this brings about an effect of cutting the machining cost of the clearance groove 5.

Embodiment 4

Figure 6:
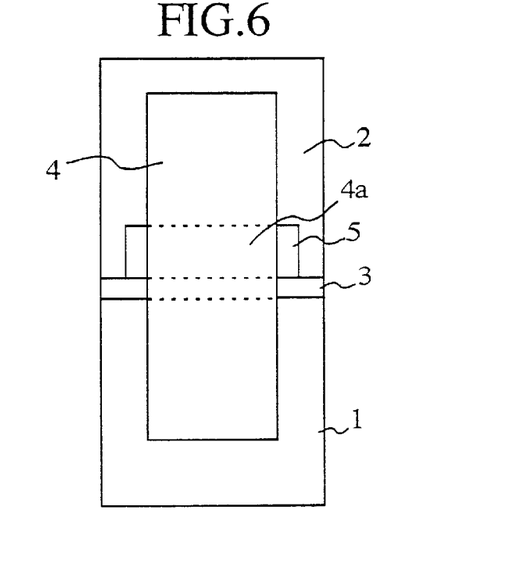
FIG. 6 is a plan view showing a flexible liquid crystal display panel mounting structure according to Embodiment 4 of the present invention.

FIG. 6 is a plan view showing a flexible liquid crystal display panel mounting structure according to Embodiment 4 of the present invention, and in FIG. 6, the clearance groove 5 is provided so that its opposite end portions in its lengthwise direction are not exposed onto both side portions of the lid 2.

Since other parts and operation of this embodiment are the same as in the above-described Embodiment 3, no description will be repeated.

As mentioned above, this Embodiment 4 produces an effect of enhancing the appearance of the side portions of the lid 2.

Embodiment 5

Figure 7:
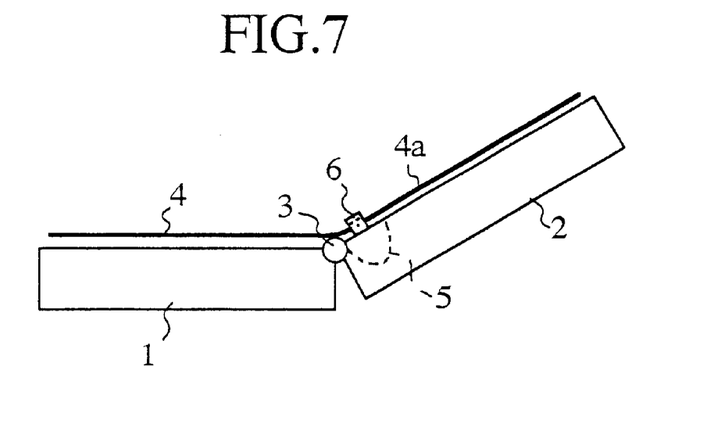
FIG. 7 is a side view depicting the open-up state of portable electronic equipment using a flexible liquid crystal display panel mounting structure according to Embodiment 5 of the present invention.
Figure 8:
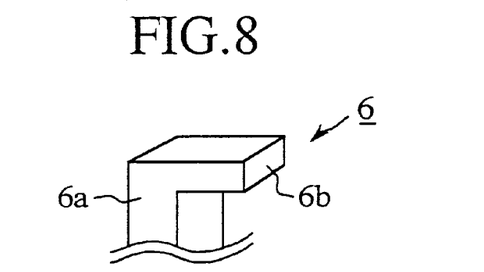
FIG. 8 is an enlarged diagram showing a stopper.
Figure 9:
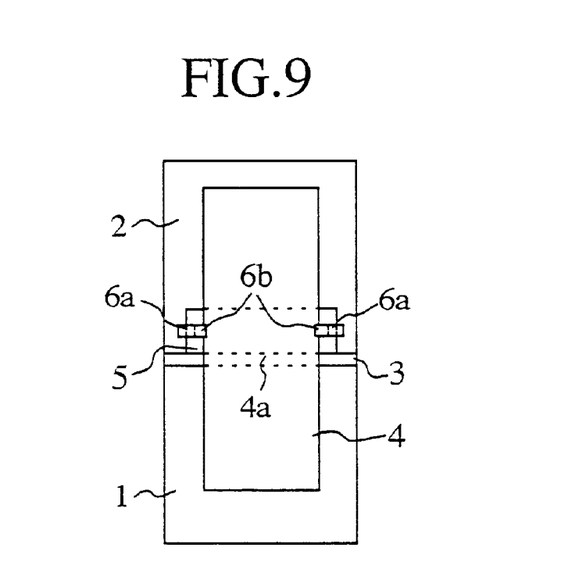
FIG. 9 is a plan view depicting the flexible liquid display panel mounting structure.
Figure 10:
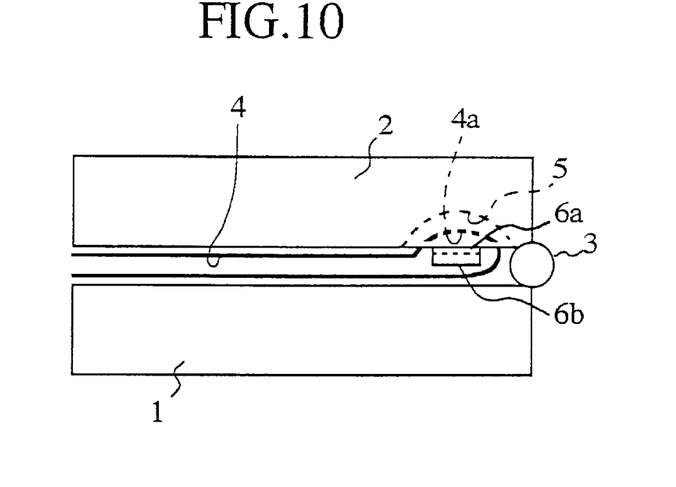
FIG. 10 is a side view depicting the closed state of portable electronic equipment using the flexible liquid crystal display panel mounting structure.

FIG. 7 is a side view depicting the open-up state of portable electronic equipment using a flexible liquid crystal display panel mounting structure according to Embodiment 5 of the present invention, FIG. 8 is an enlarged perspective view showing a stopper, FIG. 9 is a plan view showing the flexible liquid crystal display panel mounting structure, and FIG. 10 is a side view showing the closed state of the portable electronic equipment using the flexible liquid crystal display panel mounting structure.

In FIGS. 7 through 10, reference numeral 6 denotes stoppers disposed on the lid 2 near opposite end portions of the clearance groove 5 lengthwise thereof, for preventing separation of the bend 4a in the flexible liquid crystal display panel 4 from the clearance groove 5 when it is bend. The stoppers 6 area each provided with an upright portion 6a planted on the lid 2 and a locking portion 6b capable of locking the flexible liquid crystal display panel 4. In this instance, the stoppers 6 are formed of a transparent or colored material. Incidentally, the position and area of each stopper need not always be at the upper portion of the clearance groove 5. Further, the number of stoppers is not limited specifically to the mentioned here.

On the main body 1 there is provided a stopper (a folding angle limiting member), though not shown, to keep the lid 2 from opening in excess of 180 degrees with respect to the main body 1. This stopper is intended to prevent the flexible liquid crystal display panel 4 from opening more than 180 degrees and being broken. Accordingly, if this requirement could be satisfied, the main body 1 and the lid 2 may be structured so that they open more than 180 degrees relative to each other. This stopper may be mounted on the lid 2 or on either of the main body 1 and the lid 2.

Since other parts and operation of this embodiment are the same as those in the above-described Embodiment 4, no description will be repeated.

As described above, this Embodiment 5 not only produces the same effect as that obtainable with the above-described Embodiment 4 but also brings about an effect of preventing separation of the bend 4a in the flexible liquid crystal display panel 4 from the clearance groove 5 when the display panel is bent, thereby enabling the bend 4a to smoothly enter the clearance groove 5.

Furthermore, it is possible to obtain an effect that a display image on the flexible liquid crystal display panel can be held continuous at the positions where the stoppers 6 are disposed.

It is also possible to obtain an effect of hiding edges of the liquid crystal display panel.

Embodiment 6

Figure 11:
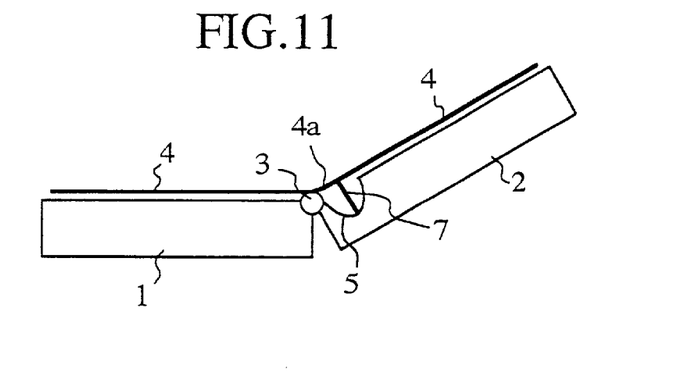
FIG. 11 is a side view depicting the open-up state of portable electronic equipment using a flexible liquid crystal display panel mounting structure according to Embodiment 6 of the present invention.
Figure 12:
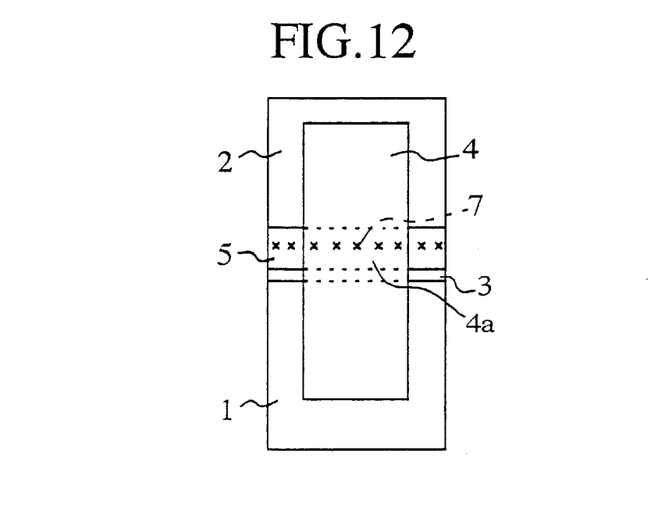
FIG. 12 is a plan view showing the flexible liquid crystal display panel mounting structure.
Figure 13:
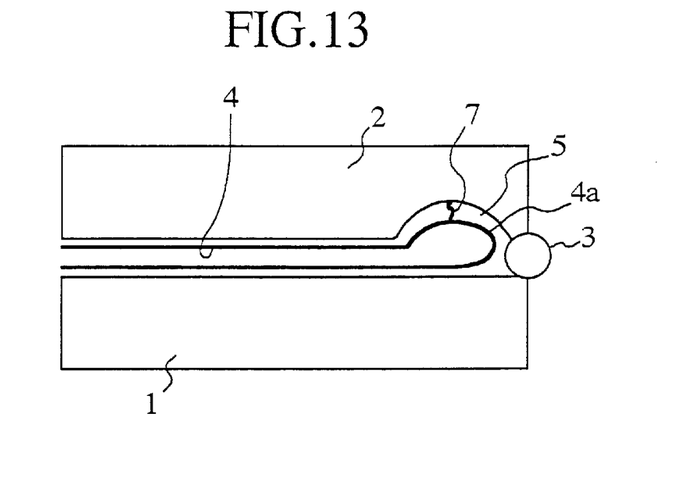
FIG. 13 is a side view depicting the closed state of the portable electronic equipment using the flexible liquid crystal display panel mounting structure.

FIG. 11 is a side view showing the open-up state of portable electronic equipment using flexible liquid crystal display panel mounting structure according to Embodiment 6 of the present invention, FIG. 12 is a plan view showing the flexible liquid crystal display panel mounting structure, and FIG. 13 is a side view showing the closed state of the portable electronic equipment using the flexible liquid crystal display panel mounting structure.

In FIGS. 11 through 13, reference numeral 7 denotes a stopper that couples the bend 4a in the flexible liquid crystal display panel 4 and the clearance groove 5 opposite thereto to prevent that the bend 4a goes away from the clearance groove 5 when the panel is bent. This stopper 7 is made of a wire-like material and individual stoppers are disposed at predetermined intervals as indicated by marks "x" in FIG. 12.

Since other parts and operation of this embodiment are the same as in the above-described Embodiment 3, no description will be repeated.

Next, the operation of this embodiment will be described.

Since the bend 4a in the flexible liquid crystal display panel 4 is coupled by the stopper 7 to the clearance groove 5, it is possible to keep the bend 4a from getting out of the clearance groove 5 when the lid 2 is closed, allowing the bend 4a to smoothly enter the clearance groove 5.

As described above, according to this Embodiment 6, the same effect as that obtainable with the above-described Embodiment 3 can be obtained; in addition to this, since the stopper 7 is mounted on the back of the flexible liquid crystal display panel 4, the appearance of the display screen can be secured and at the same time the bend 4a can be prevented from getting out of the clearance groove 5 when the flexible liquid crystal display panel 4 is bent, producing an effect of allowing the bend 4a to smoothly getting into the clearance groove 5.

While the stopper 7 has been described to be formed by a wire-like member in the above Embodiment 6, it may be formed by a plate-like member, in which case it is possible to obtain an effect of secure larger strength than in the case of using the wire-like member.

Embodiment 7

Figure 14:
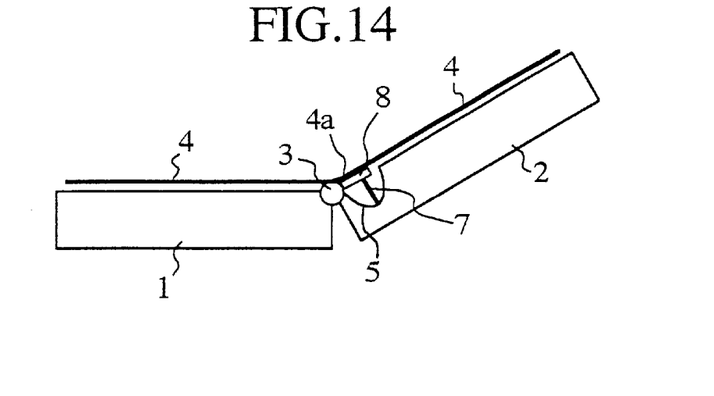
FIG. 14 is a side view depicting the open-up state of portable electronic equipment using a flexible crystal display panel mounting structure according to Embodiment 7 of the present invention.
Figure 15:
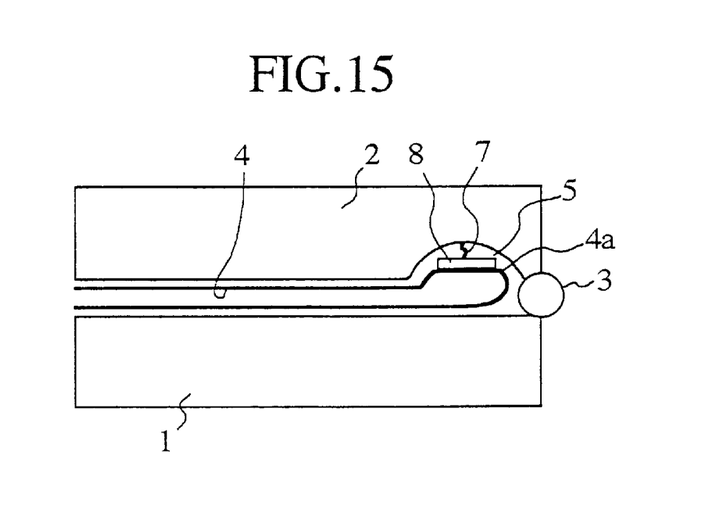
FIG. 15 is a side view depicting the closed state of the portable electronic equipment using the flexible quid crystal display panel mounting structure.

FIG. 14 is a side view depicting the open-up state of portable electronic equipment using flexible liquid crystal display panel mounting structure according to Embodiment 7 of the present invention, and FIG. 15 is a side view of the closed state of the portable electronic equipment using the flexible liquid crystal display panel mounting structure.

In FIGS. 14 to 15, reference numeral 8 denotes a plate-like warp preventive member fixed to the back of the bend 4a and connected to the stopper 7 so as to prevent warp of the bend 4a in the flexible liquid crystal display panel 4.

Since other parts are the same as those in the above-described Embodiment 6, no description will be repeated.

Next, the operation of this embodiment will be described.

The bend 4a is in contact with the plate-like warp preventive member 8 over the entire area of its one side and is connected to the stopper 7 through this warp preventive member 8, and hence it is free from warpage.

Accordingly, distortion or the like of a display image at the portion concerned is prevented from occurrence.

As described above, according to this Embodiment 7, the same effect as that obtainable with the above-described Embodiment 6 can be obtained, and in addition, it is possible to prevent warpage of the bend 4a in the flexible liquid crystal display panel 4 and hence prevent distortion of a display image.

While the stopper 7 has been described to be formed by a wire-like member in the above-described Embodiment 7, it may also be plate-like member, in which case it is possible to bring about an effect to obtain a large strength than in the case of using the wire-like member.

Embodiment 8

Figure 16:
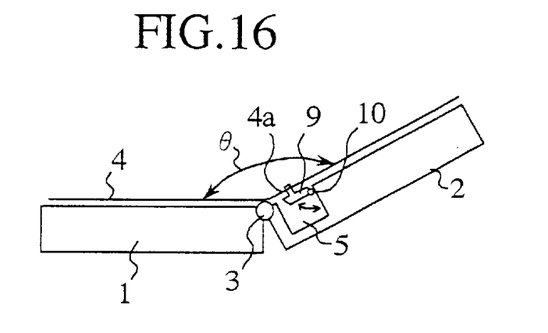
FIG. 16 is a side view showing the open-up state of portable electronic equipment using a flexible liquid crystal display panel according to Embodiment 8 of the present invention.
Figure 17:
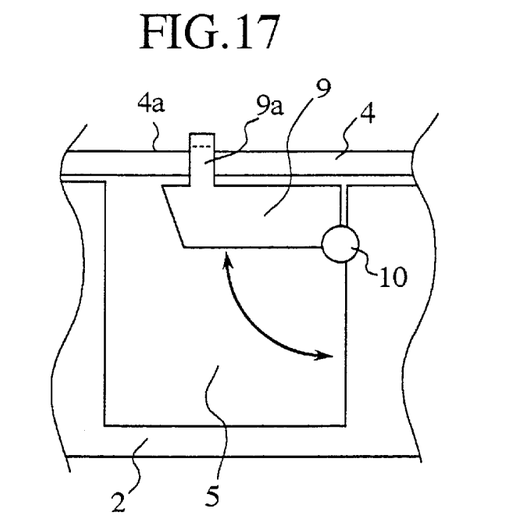
FIG. 17 is a partial side view showing the state of a guide stopper before operation.
Figure 18:
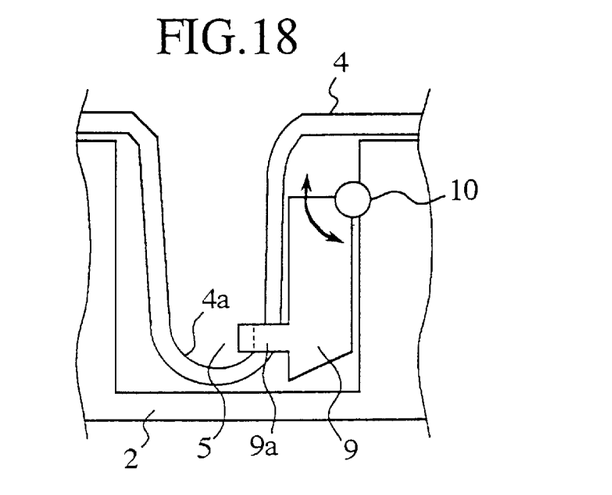
FIG. 18 is a partial side view showing the state of the guide stopper after operation.

FIG. 16 is a side view showing the open-up state of portable electronic equipment using a flexible liquid crystal display panel mounting structure according to Embodiment 8 of the present invention, FIG. 17 is a partial side view showing the state before operation of a guide stopper, and FIG. 18 is a partial side view showing the state after operation of the guide stopper.

In FIGS. 16 through 18, reference numeral 9 denotes a guide stopper (a stopper) that keeps the bend 4a from getting out of the clearance groove 5 when the panel is bent and guides the bend 4a into the clearance groove 5 while following the movement of the bend 4a. That is to say, this guide stopper has a transparent L-shaped locking hook 9a for locking the bend 4a, which is secured to the lid in a manner to freely pivot on a hinge 10 in the clearance groove 5.

Next, the operation of this embodiment will be described.

As depicted in FIGS. 16 and 17, when the angle θ through which the lid 2 is opened with respect to the main body 1 is large, that is, when the extent to which the bend 4a enters the clearance groove 5 is small, the bend 4a is prevented mainly by the locking hook 9a from getting out of the clearance groove 5.

On the other hand, as shown in FIG. 18, when the extent to which the bend 4a enters the clearance groove 5 is large, the guide stopper 9 turns into the clearance groove 5, guiding the bend 4a to a predetermined position in the clearance groove 5 with certainty and smoothly.

As described above, according to this Embodiment 8, it is possible to obtain an effect of guiding the bend 4a into the clearance groove 5 surely and smooth regardless of the extent to which of the bend enters the groove.

Incidentally, when the flexible liquid crystal display panel 4 has its marginal edges fixed to the main body 1 and the lid 2 by a frame not shown, the frame itself serves also as the guide stopper 9; hence, the same effect as mentioned above can be obtained even if the guide stopper 9 is not provided.

While in this Embodiment 8 the opposite end portions of the clearance groove 5 lengthwise thereof are shown to be exposed onto the both sides of the lid 2, the appearance of the both sides can also be enhanced by forming the groove so that its both ends cannot be seen from outside. Further, although the clearance groove 5 is shown to be rectangular in section, it is not limited specifically thereto but may also be semicircular or similarly curved.

Moreover, while in the above Embodiments 1 through 8 the main body 1 and the lid 2 have been described to be folded into two, the present invention is also applicable to a structure that is folded into three or more and every product that uses the flexible liquid crystal display panel 4 in a bent form.

INDUSTRIAL APPLICABILITY

As described above, the flexible liquid crystal display panel mounting structure is adapted so that when the liquid crystal display panel mounting members are folded, the bend in the flexible liquid crystal display panel is caused to enter the clearance groove with a sufficient curvature; hence, the structure of the present invention is useful as a flexible liquid crystal display panel mounting structure for preventing the bend from damage and degradation even if the bending frequency of the flexible liquid crystal display panel increases.

What is claimed is:

1. A mounting structure for a liquid crystal display panel comprising:
   a foldable liquid crystal display panel mounting member, and a flexible liquid crystal display panel mounted on said liquid crystal display panel mounting member across a folding portion thereof, wherein a clearance groove is provided in said liquid crystal display panel mounting member proximate said folding portion to receive a bend that is formed in said flexible liquid crystal display panel by folding of said liquid crystal display panel mounting member when said foldable liquid crystal display mounting member is folded.

2. A mounting structure for a liquid crystal display panel according to claim 1, wherein the clearance groove is provided so that opposite end portions of said groove in a lengthwise direction are not exposed to outside surfaces of the liquid crystal display panel mounting member.

3. A mounting structure for a liquid crystal display panel according to claim 1, wherein a stopper for keeping the bend in the flexible liquid crystal display panel from extending out of the clearance groove when the display panel is folded is provided on the liquid crystal display panel mounting member.

4. A flexible liquid crystal display panel mounting structure according to claim 3, wherein a folding angle limiting member is mounted on the liquid crystal display panel mounting member to limit the folding angle of the liquid crystal display panel mounting member so that an included angle, which is formed between the flexible liquid crystal display panel members by the folding of the liquid crystal display panel mounting member, does not exceed 180 degrees.

5. A flexible Crystal liquid display panel mounting structure according to claim 3, wherein the stopper is made of a transparent material.

6. A mounting structure for a liquid crystal display panel according to claim 1, wherein a stopper is provided which couples the bend in the flexible liquid crystal display panel and the clearance groove opposite said panel to prevent the bend from extending out of the clearance groove when the display panel is folded.

7. A flexible liquid crystal display panel mounting structure according to claim 6, wherein a warp preventive member for preventing the bend in the flexible liquid crystal display panel is disposed between the bend and the stopper.

8. A flexible liquid crystal display panel mounting structure according to claim 6, wherein the stopper is formed by a wire-like member.

9. A flexible liquid crystal display panel mounting structure according to claim 6, wherein the stopper is formed by a plate-like member.

10. A mounting structure for a liquid crystal display panel according to claim 1, wherein a stopper is provided in the clearance groove which keeps the bend in the flexible liquid crystal display panel from extending out of the clearance groove when the display panel is folded, and which guides the bend into the clearance groove while following the movement of the bend when it enters the clearance groove.

11. A flexible liquid crystal display panel mounting structure according to claim 1, wherein a touch-sensitive input operating part through which data can be entered by touching is provided as an integral part of the flexible liquid crystal display panel.

12. A flexible liquid crystal display panel mounting structure according to claim 1, wherein the clearance groove is curved in section.

* * * * *